3,017,974
TRANSMISSION CLUTCH CONTROL
Harold L. Lasley, West Des Moines, Iowa, assignor to General Motors Corporation, Detroit, Mich., a corporation of Delaware
Filed Dec. 7, 1959, Ser. No. 857,793
10 Claims. (Cl. 192—4)

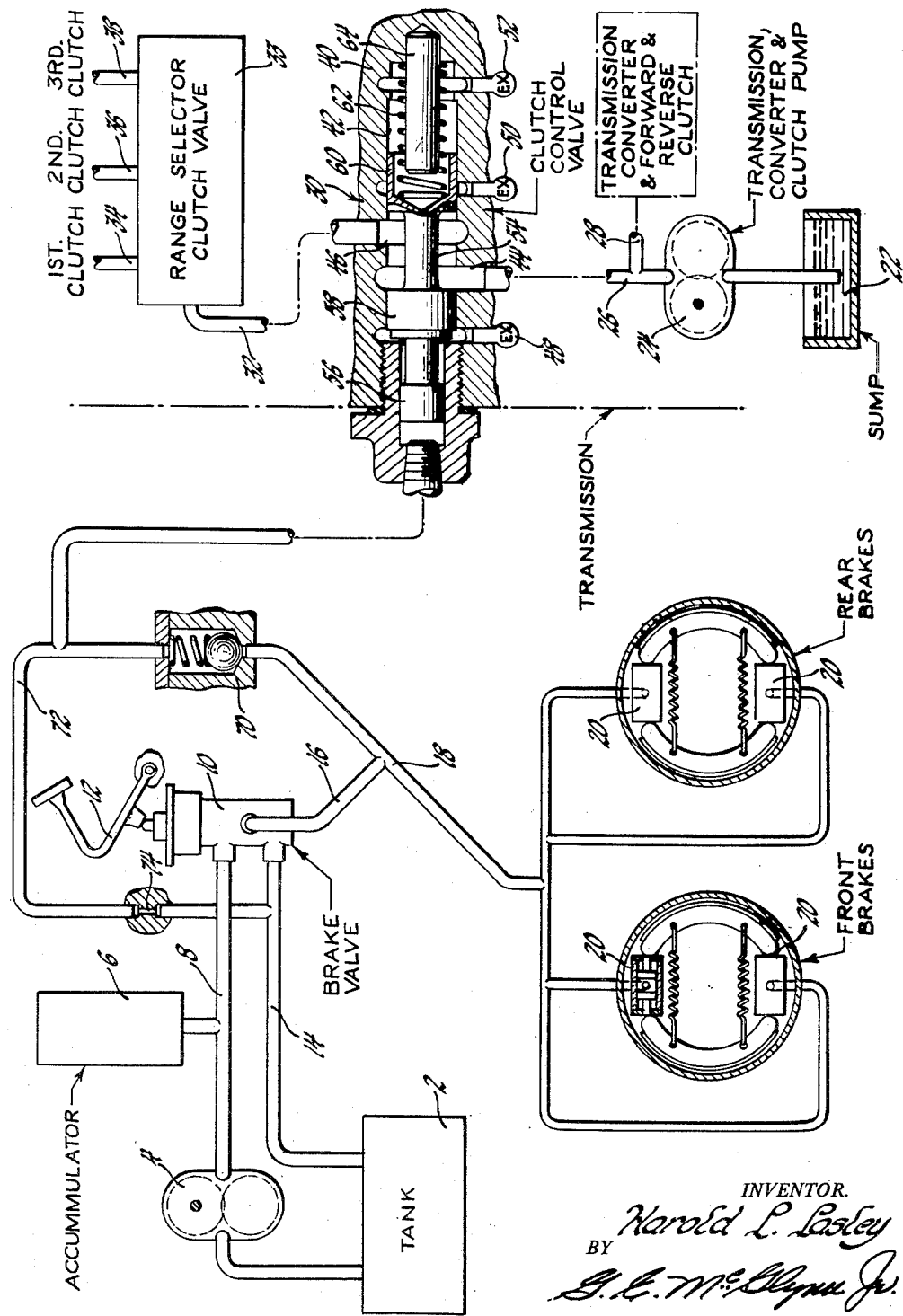

This invention relates to automotive vehicles equipped with fluid pressure operated braking and power transmission systems including means for automatically disengaging the transmission upon the application of braking pressure in the brake system and, more particularly, is directed to an improvement in a system of this type disclosed in the copending United States application Serial No. 812,268, filed May 11, 1959, in the name of Ralph J. Bernotas.

This invention is directed particularly to that class of heavy duty vehicles such as is found in the earth working trade and which, during ordinary operation, are subjected to quite frequent braking action. For example, a front end loader is a vehicle which carries at its front end a suitable linkage supporting a loader bucket. Through such means as hydraulic rams or the like, such a loader vehicle is adapted to dig, transport and dump loads. Such vehicles typically include fluid power transmissions utilizing a torque converter or other fluid coupling and a plurality of fluid operated clutches or brakes which may be selectively engaged by a manually operated selector valve to select a particular gear range in the transmission. Naturally, such vehicles also include a suitable fluid pressure operated braking system. Inasmuch as such vehicles are subjected to repeated braking, it is desirable, for several reasons, to provide some means for automatically disengaging the transmission upon application of the brake.

In the first instance, power is obviously wasted if drive continues to be transmitted through a vehicle transmission while the vehicle is being braked. With reference particularly to a front end loader or other vehicles of this type, the operator is normally quite intent on the proper operation of the device or devices with which the vehicle is equipped, and it is not readily convenient for him to de-clutch or interrupt drive through the transmission each time he applies his brakes.

Therefore, it is a principal object and feature of this invention to provide means for automatically disengaging a fluid power transmission in response to the application of braking pressure in a vehicle braking system.

Quite frequently, the operator of such vehicles to which reference has been made will repeatedly apply slight braking pressure to the vehicle to enable the latter to perform as efficiently as possible. For example, with reference to a front end loader, the vehicle operator may drive up to a heaped pile of material with his bucket in the loading position. At this point, he may wish to "inch" into the material in an effort to obtain a loaded bucket, thereby requiring repeated braking efforts. In such a situation, it is not too feasible to require the vehicle operator to repeatedly manually disengage and engage the transmission as he brakes the vehicle. Additionally, the particular operation may be such that the vehicle operator does not wish to disengage the transmission inasmuch as he is applying only slight braking pressure and does not wish to wait for the transmission to automatically become engaged again upon release of the braking pressure.

Therefore, it is yet another object and feature of this invention to provide a means for automatically disengaging a fluid power transmission in response to the application of a predetermined high amount of braking pressure in the brake system such as substantially full-stop braking pressure.

In a system of this type in which the transmission is to be disengaged in response to full-stop or a predetermined amount of brake pressure, it is equally desirable that the transmission be adapted for prompt re-engagement when the brake pressure falls below such full-stop pressure. For example, if the vehicle is braked to a full stop on an incline thereby resulting in transmission disengagement, a condition may follow in which brake pressure is reduced to a point below full-stop but sufficiently high to hold the vehicle on the incline. Thereafter, if brake pressure is further reduced to release the vehicle for travel, the vehicle may roll a considerable distance depending on the nature of the incline before the transmission re-engages.

It is, therefore, another object and feature of this invention to provide means for automatically re-engaging the transmission after full-stop braking in response to brake pressure falling below the full-stop or otherwise predetermined brake pressure.

As is well known, clutch or brake plates are employed in such a fluid power transmission aforementioned in order to select a particular gear range through the transmission. As is equally well known, rapid engagement and disengagement of the clutch plates is quite important since these plates deteriorate rapidly if subjected to repeated slipping under the conditions of operation to which they are subjected.

Therefore, it is yet another object and feature of this invention to provide an automatically operable transmission disengaging means which will operate rapidly to engage and disengage the transmission without undue slipping of the clutch or brake plates aforementioned.

In general, these and other objects of this invention are attained in the combination of a vehicular braking system and power transmission with fluid-operated over-control means communicating the brake system to the power transmission system so as to disengage the latter automatically in response to a predetermined substantially full-stop braking pressure. To this end, the transmission includes a de-clutching or other drive interrupting valve having inlet and pressure ports adapted to communicate the transmission fluid power source to the engageable and disengageable clutch plates or other drive means through which drive is conducted in the transmission. The valve also includes an exhaust port for dumping the fluid from the fluid-actuated drive means. The valve is operated in response to braking pressure in the brake system to move the valve from a first position communicating the drive means with the transmission fluid source to a second position interrupting flow of fluid from the transmission source and dumping the fluid-operated drive means to tank. Check valve means is provided in the connection between the braking system and the over-control valve to insure that the latter is operated rapidly and only upon the achievement of a predetermined relatively high braking pressure in the brake system so as to insure that the transmission is not disengaged when relatively slight braking pressures are applied. Furthermore, a bleed connection is made to the over-control valve between the latter and the aforementioned check valve so that the pressure acting on the over-control valve is bled off rapidly when the pressure in the braking system falls below the setting of the check valve.

These and other objects of this invention will become more apparent hereinafter as the description of the invention proceeds, and in which reference is made to the drawing illustrating the invention. In order to facilitate an understanding of the invention, wherever possible conventional components and those readily commercially available are shown essentially diagrammatically or schematically in the drawing.

Referring now to the drawing, there is illustrated essentially schematically a brake system comprising a tank 2 for hydraulic fluid from which the pump 4 draws to supply fluid under pressure to the accumulator 6 and through the conduit 8 to the brake treadle valve 10 which is operated in response to depression of the brake pedal 12. The return line to the tank is indicated at 14. The pressure port of the brake valve 10 is connected to the conduit 16 which is connected through the line 18 to the front and rear brakes which are of conventional construction including the fluid pressure-actuated brake cylinders or motors 20.

The fluid power transmission system includes a source of hydraulic fluid 22 which is supplied under pressure by the pump 24 to the conduit 26 and branch conduit 28. The branch conduit 28 supplies fluid under pressure to the transmisison torque converter and forward and reverse clutch, while the main conduit 26 supplies fluid under pressure to the over-control or transmission cut-off valve 30. A conduit 32 connects the over-control valve 30 to the range selector clutch valve 33 which is of conventional construction and is adapted to be manually selectively shifted to supply fluid under pressure through different conduits 34, 36 and 38, respectively, supplying fluid motor actuated disc clutches or brakes to select a first, second or third gear range through the transmission.

It will be seen that the over-control valve 30 includes a valve body 40 having an internal bore 42 therethrough. An annular inlet port 44 communicates with the pressure conduit 26, while a similar pressure outlet port 46 communicates with the range selector clutch valve 33 through the conduit 32. Each of the exhaust ports 48, 50 and 52 are adapted to return fluid to the tank or sump 22. It will be noted that the end exhaust ports 48 and 52 are disposed at either end of the valve body bore 42 so as to prevent any adverse pressure build-up on the valve spool to be described.

The valve spool 54 is axially reciprocably mounted within the valve body bore and includes a piston head 56 at one end thereof and a pair of axially spaced valve lands 58 and 60. The valve land 60 is in the form of a cup to define a seat for a spring 62 guided about a coaxial stud 64 secured within the valve body. The pressure of the spring 62 normally disposes the valve spool in the position shown in the drawing, and in which position the inlet port 44 and pressure port 46 are placed in communication with each other, while the valve land 60 closes the exhaust port 50. When the valve spool is shifted to the right in a manner to be described, the valve land 58 closes the inlet port 44 and the valve land 60 is shifted to the right until it abuts the stud 64 while opening the exhaust port 50 for communication with the pressure outlet port 46. In this shifted position, fluid under pressure is no longer supplied from the pump to the selected clutch, while the latter is dumped to tank thereby disengaging the transmission.

In order to shift the spool valve 54 in response to braking pressure in the brake system, the conduit 18 is connected to the valve body 40 so as to communicate braking pressure to the end of the piston 56 on the valve spool. The conduit 18 includes the one-way spring-loaded ball check valve 70 which is adapted to be moved from its seat in response to a predetermined braking pressure in the brake system to supply fluid to the piston end of the valve spool to shift the latter to the right as aforedescribed. Upon release of the predetermined braking pressure, return fluid from the control valve 30 may pass through conduit 72 connecting line 18 downstream of check valve 70 to the return line 14. A fitting including a small restriction or orifice 74 is connected in the conduit 72.

Referring now to the operation of the mechanism disclosed, it may be assumed that the vehicle operator has adjusted the selector valve 33 to place the transmission in a particular gear range, and is travelling along without applying any braking effort. At this time, the over-cotnrol or clutch valve 30 is in the position shown in which fluid from the pump 22 may pass through the inlet port 44 to the outlet port 46 and through the selector valve to apply the selected clutch. If the operator should now apply a predetermined braking pressure to the pedal 12, the check valve 70 will open to permit fluid under pressure in the line 18 to rapidly reciprocate the valve spool 54 to the right. As a result, the valve land 58 interrupts communication between the inlet port 44 and outlet port 46, valve land 60 opens exhaust port 50 and fluid pressure is dumped from port 46 through the exhaust port 50 to tank. As soon as the predetermined braking pressure in the braking system is relieved, pressure will drop in the conduit 18, the check valve 70 will immediately close and return fluid will flow through the conduit 72 and orifice 74. As a result, the spring 62 rapidly shifts the valve spool 54 back to the position shown in the drawing, thereby again permitting the flow of fluid under pressure through the valve 30 to reapply the selected clutch and place the transmission back in gear. Shifting of the valve spool 54 is quite rapid in either direction, thereby providing rapid engagement and disengagement of the selected clutch and avoiding undue slipping of the latter.

As aforementioned, there will be times in which the operator may wish to apply a slight braking pressure without disengaging his transmisison. Therefore, the spring-loaded check valve 70 is set to open at some predetermined relatively high braking pressure in the brake system. For example, in one preferred application of the invention, the brake line pressure in the conduit 18 reaches a maximum of about 1,000 p.s.i. The check valve 70 is accordingly set to open at approximately 700 p.s.i. The 700 p.s.i. setting for the valve 70 corresponds to the application of a braking pressure of a significant nature which indicates that the operator wishes to fully stop the machine.

Finally, it will be noted that the aforedescribed construction avoids the possibly dangerous condition of the vehicle rolling on an incline upon release of the brakes. In this regard, and again referring to the preferred embodiment, some selected low pressure such as only approximately 100 p.s.i. pressure is required to shift spool 54 to the transmission disengage position while the open-close transition point of valve 70 is at a pressure of approximately 700 p.s.i. to insure transmisison disengagement at only such higher pressure. Thus, when full-stop braking pressure is released so that the pressure in the brake system is less than the setting of valve 70, the latter closes to stop the flow of fluid to over-control valve 30. Immediately, the fluid pressure acting on valve 30 is bled through conduit 72 to permit rapid shifting of spool 54 to the position shown in the drawing and the transmission is re-engaged. Therefore, in a situation in which the vehicle is brought to a full stop on an incline and then the pressure in the braking system is adjusted to a value less than the setting of valve 70 but sufficient to hold the vehicle stationary, the bleeding action aforedescribed insures that the transmission will be re-engaged to hold the vehicle on the incline when the brakes are released. The diameter of orifice 74 is so selected in any given installation so as to be small enough in relation to the capacity of pump 4 to insure that fluid will be available for operating the over-control valve 30 although some fluid will be bled through conduit 72, while being large enough for rapid bleeding of valve 30 to re-engage the transmission as aforedescribed.

While but one form of the invention has been selected for a description thereof, other forms will be apparent to those skilled in the art. Therefore, the embodiment shown in the drawing is merely for illustrative purposes, and is not intended to limit the scope of the invention which is defined by the claims which follow.

I claim:

1. In a vehicle, the combination comprising fluid pressure-operated vehicle brakes, a fluid pressure brake system including means for supplying fluid under pressure to said brakes to engage the latter, a power transmission including fluid pressure-actuated drive means engageable to conduct drive through said transmission and disengageable to interrupt drive therethrough, a fluid pressure transmission system for supplying fluid under pressure to said drive means, a fluid pressure-operated control valve in said transmission system controlling the flow of fluid through the latter to said drive means and having a first position permitting flow of fluid through said transmission system and a second position interrupting said flow, means connecting said brake system to said control valve to adjust the latter from said first position to said second position in response to the application of a predetermined braking pressure in said brake system in excess of the pressure required to adjust said control valve from said first position to said second position, and means connected to said control valve for exhausting fluid pressure from and automatically shifting the latter to said first position at any time that the pressure in said brake system is less than said predetermined pressure.

2. In a vehicle, the combination comprising fluid pressure-operated vehicle brakes, a fluid pressure brake system including means for supplying fluid under pressure to said brakes to engage the latter, a power transmission including fluid pressure-actuated drive means engageable to conduct drive through said transmission and disengageable to interrupt drive therethrough, a fluid pressure transmission system for supplying fluid under pressure to said drive means, a fluid pressure-operated control valve in said transmission system controlling the flow of fluid through the latter to said drive means and having a first position permitting flow of fluid through said transmission system and a second position interrupting said flow, means connecting said brake system to said control valve to adjust the latter from said first position to said second position in response to the application of substantially full braking pressure in said brake system, and means connected to said control valve for exhausting fluid pressure from and automatically shifting the latter to said first position at any time that the pressure in said brake system is less than said substantially full braking pressure.

3. In a vehicle, the combination comprising fluid pressure-operated vehicle brakes, a fluid pressure brake system including means for supplying fluid under pressure to said brakes to engage the latter, a power transmission including fluid pressure-actuated drive means engageable to conduct drive through said transmission and disengageable to interrupt drive therethrough, a fluid pressure transmission system supplying fluid under pressure to said drive means, a fluid pressure-operated control valve in said transmission system controlling the flow of fluid through the latter to said drive means and having a first position permitting flow of fluid through said transmission system and a second position interrupting said flow, means including a check valve connecting said brake system to said control valve to adjust the latter from said first position to said second position in response to the application of substantially full braking pressure in said brake system, and means connected to said control valve for exhausting fluid from the latter to permit automatic movement thereof to said first position at any time that the pressure in said brake system is less than said full braking pressure.

4. In a vehicle, the combination comprising fluid pressure-operated vehicle brakes, a fluid pressure brake system including means for supplying fluid under pressure to said brakes to engage the latter, a power transmission including fluid pressure-actuated drive means selectively engageable to conduct drive through said transmission and disengageable to interrupt drive therethrough, a fluid pressure transmission system for supplying fluid under pressure to said drive means, a fluid pressure-operated control valve in said transmission system controlling the flow of fluid through the latter to said drive means and having a first position permitting flow of fluid through said transmission system and a second position interrupting said flow, a pressure supply conduit including check valve means connecting said brake system to said control valve to adjust the latter from said first position to said second position in response to the application of substantially full braking pressure in said brake system, and a bleed conduit connected to said supply conduit between said check valve means and control valve for bleeding fluid from the latter to permit automatic movement thereof to said first position at any time that the pressure in said brake system is less than said full braking pressure.

5. In a vehicle, the combination comprising fluid pressure-operated vehicle brakes, a fluid pressure brake system including means for supplying fluid under pressure to said brakes to engage the latter, a power transmission including fluid pressure-actuated drive means selectively engageable to conduct drive through said transmission and disengageable to interrupt drive therethrough, a fluid pressure transmission system including manually operable selector valve means for selectively supplying and interrupting the flow of fluid under pressure to said drive means to engage and disengage the latter, a fluid pressure-operated control valve in said transmission system controlling the flow of fluid through the latter to said drive means irrespective of the position of said selector valve means and having a first position permitting flow of fluid through said transmission system and a second position interrupting said flow, a pressure supply conduit including check valve means connecting said brake system to said control valve to adjust the latter from said first position to said second position in response to the application of a predetermined braking pressure in said brake system, and a bleed conduit connected to said supply conduit between said check valve means and control valve for bleeding fluid from the latter to permit automatic movement thereof to said first position at any time that the pressure in said brake system is less than said predetermined pressure.

6. In a vehicle, the combination comprising a fluid pressure-operated brake system including fluid pressure-actuated brake means, a brake fluid circuit connected to said brake means, and a manually operable brake valve in said circuit selectively controlling the amount of braking pressure supplied to said brake means, a power transmission including fluid pressure actuated drive means selectively engageable to conduct drive through said transmission, a transmission fluid circuit connected to said drive means; means for automatically disengaging said drive means in response to the application of substantially full braking pressure in said brake system, said means comprising a control valve in said transmission circuit, spring means urging said valve to a first position permitting the flow of fluid under pressure to said drive means, and being yieldable upon shifting of said valve to a second position to exhaust fluid pressure from said drive means, a supply conduit communicating braking system pressure to said valve in opposition to said spring means, check valve means in said conduit permitting the flow of fluid under pressure through said conduit to said valve only at substantially full braking pressure in said brake system, and a bleed conduit for bleeding fluid from said control valve to permit the latter to shift to said first position at any pressure in said braking system less than said full braking pressure.

7. In a vehicle, the combination comprising a fluid pressure-operated brake system including a source of fluid under pressure and fluid pressure-actuated brake means, a brake fluid circuit connected to said brake means, and a manually operable brake valve in said circuit selectively controlling the amount of braking pressure supplied to said brake means; a power transmission including fluid pressure-actuated drive means selectively engageable to conduct drive through said transmission, a transmission fluid circuit connected to said drive means; means for automatically disengaging said drive means in response to the application of substantially full braking pressure in said brake system, said means comprising a shiftable control valve in said transmission circuit, spring means urging said valve to a first position permitting flow of fluid under pressure to said drive means, and being yieldable upon shifting of said valve to a second position to exhaust fluid pressure from said drive means, a supply conduit communicating braking system pressure to said valve in opposition to said spring means, a one-way spring loaded check valve in said conduit permitting the flow of fluid under pressure through said conduit to said valve only at substantially full braking pressure in said brake system, and a bleed conduit connected between said control valve and said source and bypassing said check valve for bleeding fluid from said control valve to permit the latter to shift to said first position at any pressure in said braking system less than said full braking pressure.

8. In a vehicle, the combination comprising a fluid pressure-operated brake system including a source of fluid under pressure, fluid pressure-actuated brake means, a brake circuit connecting said source to said brake means, and a manually operable brake valve in said circuit selectively controlling the amount of braking pressure supplied to said brake means; a power transmission including drive means selectively engageable to conduit drive through said transmission, fluid pressure-operated motor means controlling engagement of said drive means, a source of fluid under pressure, a transmission circuit connecting said source to said motor means; means for automatically disengaging said drive means in response to the application of substantially full braking pressure in said brake system, said means comprising valve means in said transmission circuit, said valve means comprising an inlet port connected to said transmission fluid source, a pressure outlet port connected to said motor means, an exhaust port, a movable valve member controlling flow of fluid between said ports, spring means urging said valve member to a first position communicating said inlet and pressure ports and closing said exhaust port, and being yieldable upon shifting of said valve member to a second position communicating said pressure and exhaust ports, a first conduit communicating braking system pressure to said valve member in opposition to said spring means, check valve means in said conduit permitting the flow of fluid under pressure through said conduit to said valve member only at substantially full braking pressure in said brake system, and a second conduit including a small orifice connected between said control valve and said fluid source of said brake system for bleeding fluid from said control valve to shift said valve member to said first position at any pressure in said brake circuit less than said full braking pressure.

9. In a vehicle, the combination comprising fluid pressure-operated vehicle brakes, a fluid pressure brake system including means for supplying fluid under pressure to said brakes to engage the latter, a power transmission including fluid pressure-actuated drive means engageable to conduct drive through said transmission and disengageable to interrupt drive therethrough, a fluid pressure transmission system for supplying fluid under pressure to said drive means, a fluid pressure-operated control valve in said transmission system controlling the flow of fluid through the latter to said drive means and having a first position permitting flow of fluid through said transmission system and a second position interrupting said flow, means including a first conduit connecting said brake system to said control valve to adjust the latter from said first position to said second position in response to the application of a predetermined braking pressure in said brake system, and means including a second conduit connected to said first conduit for exhausting fluid pressure from said control valve to shift the latter automatically to said first position at any time that the braking pressure in said brake system is less than said predetermined pressure.

10. In a vehicle, the combination comprising fluid pressure-operated vehicle brakes, a fluid pressure brake system including means for supplying fluid under pressure to said brakes to engage the latter, a power transmission including fluid pressure-actuated drive means engageable to conduit drive through said transmission and disengageable to interrupt drive therethrough, a fluid pressure transmission system for supplying fluid under pressure to said drive means, a fluid pressure-operated control valve in said transmission system controlling the flow of fluid through the latter to said drive means and having a first position permitting flow of fluid through said transmission system and a second position interrupting said flow, means including a first conduit connecting said brake system to said control valve to adjust the latter from said first position to said second position in response to the application of a predetermined braking pressure in said brake system in excess of the pressure required to adjust said control valve from said first position to said second position, and means including a second conduit connected to said first conduit for exhausting fluid pressure from said control valve to shift the latter automatically to said first position at any time that the pressure in said brake system is less than said predetermined pressure.

References Cited in the file of this patent

UNITED STATES PATENTS

| | | |
|---|---|---|
| 2,872,000 | Herndon et al. | Feb. 3, 1959 |
| 2,904,146 | Codlin | Sept. 15, 1959 |

UNITED STATES PATENT OFFICE
CERTIFICATE OF CORRECTION

Patent No. 3,017,974                                     January 23, 1962

Harold L. Lasley

It is hereby certified that error appears in the above numbered patent requiring correction and that the said Letters Patent should read as corrected below.

Column 7, line 28, and column 8, line 29, for "conduit", each occurrence, read -- conduct --.

Signed and sealed this 8th day of May 1962.

(SEAL)
Attest:

ERNEST W. SWIDER
Attesting Officer

DAVID L. LADD
Commissioner of Patents